US012616929B2

(12) United States Patent
Einbu et al.

(10) Patent No.: US 12,616,929 B2
(45) Date of Patent: May 5, 2026

(54) SYSTEM FOR OFFSHORE CARBON DIOXIDE CAPTURE

(71) Applicant: EQUINOR ENERGY AS, Stavanger (NO)

(72) Inventors: Aslak Einbu, Trondheim (NO); Torbjørn Pettersen, Trondheim (NO); John Morud, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 714 days.

(21) Appl. No.: 17/915,621

(22) PCT Filed: Mar. 29, 2021

(86) PCT No.: PCT/NO2021/050088

§ 371 (c)(1),
(2) Date: Sep. 29, 2022

(87) PCT Pub. No.: WO2021/201690

PCT Pub. Date: Oct. 7, 2021

(65) Prior Publication Data

US 2023/0145006 A1 May 11, 2023

(30) Foreign Application Priority Data

Mar. 30, 2020 (GB) ..................................... 2004609

(51) Int. Cl.
| | |
|---|---|
| *B01D 47/06* | (2006.01) |
| *B01D 53/14* | (2006.01) |
| *B01D 53/18* | (2006.01) |
| *B01D 53/62* | (2006.01) |
| *B01D 53/79* | (2006.01) |

(52) U.S. Cl.
CPC ....... *B01D 47/063* (2013.01); *B01D 53/1475* (2013.01); *B01D 53/185* (2013.01); *B01D 53/62* (2013.01); *B01D 53/79* (2013.01); *B01D 2252/20447* (2013.01); *B01D 2257/504* (2013.01); *B01D 2258/01* (2013.01)

(58) Field of Classification Search
CPC B01D 47/063; B01D 53/1475; B01D 53/185; B01D 53/62; B01D 53/79
See application file for complete search history.

(56) References Cited

U.S. PATENT DOCUMENTS

| | | | |
|---|---|---|---|
| 4,895,710 A | 1/1990 | Hartmann et al. | |
| 10,596,516 B2 | 3/2020 | Pinard Westendorf et al. | |

| | | | |
|---|---|---|---|
| 2008/0250715 A1 | 10/2008 | Cooper et al. | |
| 2009/0121038 A1 | 5/2009 | Wurz | |
| 2010/0084283 A1 | 4/2010 | Gomez | |
| 2010/0175552 A1 | 7/2010 | Ghosh et al. | |
| 2010/0236242 A1 | 9/2010 | Farsad et al. | |
| 2011/0296869 A1 | 12/2011 | Buhrman et al. | |
| 2012/0121489 A1 | 5/2012 | Chew | |
| 2012/0174784 A1* | 7/2012 | Asen ...................... | B01D 53/79 |
| | | | 95/199 |
| 2014/0248201 A1 | 9/2014 | Hansen | |
| 2015/0182905 A1 | 7/2015 | Langh | |
| 2016/0251991 A1 | 9/2016 | Randall | |
| 2017/0165609 A1* | 6/2017 | Norling .............. | B01D 53/1475 |
| 2017/0296963 A1 | 10/2017 | Richardson | |
| 2018/0161719 A1* | 6/2018 | Peng ...................... | B01D 53/18 |
| 2021/0031136 A1* | 2/2021 | Fujita ................. | B01D 53/1493 |

FOREIGN PATENT DOCUMENTS

| | | | |
|---|---|---|---|
| AU | 2017369967 A1 | 6/2019 | |
| AU | 2019200519 A1 | 8/2019 | |
| CN | 105413439 A | 3/2016 | |
| EP | 0085445 A2 | 8/1983 | |
| EP | 0180670 A1 | 5/1986 | |
| EP | 0240754 B1 | 8/1992 | |
| EP | 0879632 B1 | 11/1998 | |
| EP | 2457637 A1 | 5/2012 | |
| EP | 2596850 A1 | 5/2013 | |
| EP | 2898940 B1 | 6/2017 | |
| KR | 20130073783 A | 7/2013 | |
| KR | 20130078308 A | 7/2013 | |
| WO | 03008001 A1 | 1/2003 | |
| WO | 2011005116 A1 | 1/2011 | |
| WO | 2011109359 A1 | 9/2011 | |
| WO | 15024014 A1 | 2/2015 | |

(Continued)

OTHER PUBLICATIONS

Bandyopadhyay et al., Separation and Purification Tech., (2012), v.94, p. 104-114.*

(Continued)

*Primary Examiner* — Yong L Chu
(74) *Attorney, Agent, or Firm* — Dority & Manning, P.A.

(57) ABSTRACT

A capture system for offshore carbon dioxide capture and a method for offshore carbon dioxide capture are described. A capture system for offshore carbon dioxide capture, the system comprising: a pressurised flue gas source configured to provide a pressurised flue gas 101; a solvent source configured to provide a liquid solvent; and a two-phase atomising nozzle in fluid communication with the pressurised flue gas source and the solvent source; wherein the two-phase atomising nozzle is configured for two-phase flow of a mixture of the pressurised flue gas and the liquid solvent in order to generate an atomised solvent spray of the liquid solvent.

14 Claims, 3 Drawing Sheets

(56)     References Cited

FOREIGN PATENT DOCUMENTS

| WO | WO 2016133647 A1 | 8/2016 |
| WO | 18100430 A1 | 6/2018 |

OTHER PUBLICATIONS

Sep. 12, 2024—(GB) Combined Search and Examination Report—
App. No. GB2412558.5.
Jun. 23, 2021—(WO) International Search Report and Written
Opinion—App PCT/NO2021/050088.
Aug. 7, 2020—(GB) Search Report—APP 2004609.0.
Extended European Search Report for corresponding Application
No. EP 21778991.6, dated Jan. 21, 2025, 19 pages.

* cited by examiner

Droplet size: 50 μm

Droplet size: 50 μm

SYSTEM FOR OFFSHORE CARBON DIOXIDE CAPTURE

The present application claims priority from and is a U.S. National Phase of International Application No. PCT/NO2021/050088, which was filed on Mar. 29, 2021, designating the United States of America and claiming priority to United Kingdom Patent Application No. 2004609.0, filed on Mar. 30, 2020. This application claims priority to and the benefit of the above-identified applications, which are all fully incorporated by reference herein in their entireties.

The present invention relates to a capture system for offshore carbon dioxide capture and a method for offshore carbon dioxide capture.

The environmental impact caused by carbon dioxide emissions is well documented and well understood to be a significant challenge to overcome. For example, one area of technology where carbon dioxide emission is significant is the international shipping industry. The Third International Maritime Organisation Greenhouse Gas Study (2014) estimated that international shipping emitted carbon dioxide emissions accounting for 2.2% of all manmade emissions, and predicts that without intervention the amount of carbon dioxide emitted by the shipping industry could increase from between 50% and 250% of its current output, due to the general growth of the international shipping industry. In other examples, onshore and offshore oil and gas drilling platforms, vessels and/or refineries may also produce large volumes of $CO_2$ emissions. Similarly, stationary installations including waste combustion plants, power stations and manufacturing plants may all directly contribute to global carbon dioxide emissions. Accordingly, it is desired to provide a solution which significantly reduces carbon dioxide emissions of such systems, including but not limited to ships and other maritime vessels which emit carbon dioxide.

Present solutions known in the state of the art use solvents to capture and/or absorb carbon dioxide. One family of solvents which are used for carbon dioxide capture are amines, which generally operate off the following reaction:

$$RNH_2 + CO_2 \rightleftharpoons RNH_3{+} + CO^-$$

where R represents any suitable hydrocarbon chain compound.

Whilst generally referred to as a solvent in the context of gas scrubbing, the solvent does not necessarily dissolve carbon dioxide gas (which may be referred to as a solute in the present context). As will readily be appreciated by the skilled person, the solvent generally bonds with the solute in a reversible reaction. During absorption/capture, the equilibrium is positioned such that the amount of solute captured is maximised.

Carbon dioxide capture systems known in the state of the art and used for ships or the like may use a conventional scrubber column, which may comprise tightly packed particulate solvent, placed in the flow path of an exhaust gas or other flue gas to be treated. The column packing of the conventional scrubber column provides an increased surface area to absorb and/or capture the target gas. However, conventional scrubber columns are generally heavy given their solid state. Further, the flue gas must be of a significantly high pressure such that it may be driven through the conventional scrubber column as a result of the pressure differential across the packed absorber. This may require the use of additional pumps and/or compressors, which increase the weight and footprint of the conventional capture system and the energy demands of said system.

The conventional scrubber column may also have a relatively high liquid holdup time (i.e. the time which it takes the liquid solvent to pass through the conventional scrubber column) in attempting to maximise the contact time between the surface area of the conventional scrubber column and the solvent. However, the longer a liquid is held up within the conventional scrubber column the heavier the conventional scrubber column effectively is, due to the added weight of the liquid required and residing in the system.

As such there is a need to provide an improved, lower weight, compact and more energy efficient carbon dioxide capture system.

Viewed from a first aspect the invention provides a capture system for offshore carbon dioxide capture, the system comprising: a pressurised flue gas source configured to provide a pressurised flue gas; a solvent source configured to provide a liquid solvent; and a two-phase atomising nozzle in fluid communication with the pressurised flue gas source and the solvent source; wherein the two-phase atomising nozzle is configured for two-phase flow of a mixture of the pressurised flue gas and the liquid solvent in order to generate an atomised solvent spray of the liquid solvent.

It is well understood that increasing a solvent-gas contact area between a solvent and a solute may increase the ability of the solvent to dissolve and/or absorb a solute or other target compound. The provision of a two-phase atomising nozzle negates the need to place a conventional scrubber column in the capture system, as the generated atomised solvent spray has a large surface area by which to capture and/or absorb the target gas. Accordingly, given the lack of a conventional scrubber column, a larger pressure drop is observed across the capture system. The pressure drop across the two-phase atomising nozzle may be in the region of 3 kPa, or less than 3 kPa. The pressure required by a motive gas configured to drive the solvent through the capture system and hence the two-phase atomising nozzle is decreased, and thus the pressurised flue gas (e.g. produced by a gas turbine engine or other known pressurised flue gas source) is of suitable pressure to perform the function of the motive gas.

Thus by providing the pressurised flue gas source in flow communication with the two-phase atomising nozzle, a separate gas source is not needed to drive the solvent provided by the solvent source through the two-phase atomising nozzle. Consequentially, the weight and footprint of the capture system may be reduced.

By requiring that the pressurised flue gas is provided to the two-phase atomising nozzle which generates an atomised solvent spray, contact between the pressurised flue gas and the solvent may be increased. This may result in a higher efficiency of capture of gas, for example carbon dioxide, from the pressurised flue source by the solvent in the atomised solvent spray.

It will be readily appreciated that the two-phase flow of the mixture of the pressurised flue gas and the liquid solvent will be co-current in order to generate the atomised solvent spray of the liquid solvent. A conventional scrubber column may have multiple solvent compounds in its column packing which allow for multiple equilibrium steps in the capture/absorbance of the target solute/gas to be treated. Whilst a capture system using a two-phase atomising nozzle may have fewer equilibrium steps in its capture/absorbance process, the co-current flow of the atomised solvent spray and the pressurised flue gas may produce a larger solvent-gas contact area such that the system may compensate for the reduced number of equilibrium steps.

The capture system for offshore carbon dioxide capture may be suitable for offshore applications due to its compact (i.e. small footprint), lightweight and efficient nature. However it will be readily appreciated that such a system could be implemented onshore as well as offshore.

Whilst generally referred to as a solvent in the context of gas capture, the liquid solvent does not necessarily dissolve the pressurised flue gas (e.g. comprising carbon dioxide), which may be referred to as a solute in the present context. As will readily be appreciated by the skilled person, the solvent bonds with the solute in a reversible reaction. During absorption/capture, the equilibrium is positioned such that the amount of solute captured is maximised.

The pressurised flue gas may be configured to drive the liquid solvent through the two-phase atomising nozzle to generate the atomised solvent spray.

The atomised solvent spray may comprise solvent droplets with a droplet diameter of 150 μm or less, optionally 100 μm or less, such as droplets with diameters from 25 μm to 150 μm or diameters between 50 μm and 100 μm. Thus, the diameter of droplets that are formed upon generation of the atomised solvent spray may fall within such ranges. Thus the diameter of the droplets may be of such a value that the surface area to volume ratio of the solvent droplets in the atomised solvent spray may increase the efficiency of capture and/or absorption of a target solute, e.g. carbon dioxide, from the pressurised flue gas.

The pressurised flue gas may be generally warm (i.e. at a temperature above a standard ambient temperature of 298 K). The warmth of the pressurised flue gas may reduce an effective viscosity of the liquid solvent during mixing in the two-phase atomising nozzle. This may promote the generation of smaller solvent droplets in the atomised solvent spray.

The capture system may comprise a main flow path for flue gas from which it is desired to capture carbon dioxide. Thus, there may be an inlet to the capture system, which is upstream of the two-phase atomising nozzle, and an outlet from the capture system, which is downstream of the two-phase atomising nozzle. Flue gas (exhaust gas) may enter the inlet and flow past the two-phase atomising nozzle, being exposed to the atomised solvent spray, before passing to the outlet. The capture system may comprise further elements between the inlet and outlet as discussed below.

The pressurised flue gas source may be a gas turbine engine. Pressure generated by the gas turbine engine may provide pressurisation for the flue gas source, for example through back-pressure of the engine's exhaust. This avoids the need for a further pressure source, such as a pump, fan, blower or a compressor. However it will be readily appreciated that the pressurised flue gas source may be a pump, fan, blower or compressor configured to pressurise and optionally warm ambient air or other suitable sources in place of the gas turbine engine. Additionally, the pressurised flue gas source could be any combustion engine generally producing a pressurised and optionally warm exhaust product which may be used as the pressurised flue gas.

The pressurised flue gas for use with the two-phase nozzle may be taken from the exhaust gas of the gas turbine engine, for example with the exhaust gas divided into two or more parts, with one part providing pressurised flue gas for the two-phase nozzle and another part (which may be the remainder) flowing through the capture system, such as between the inlet and outlet discussed above, in order to provide for treatment of the exhaust gas.

The capture system may be integrated with a gas turbine engine and hence, in a second aspect, the invention may provide a gas turbine engine comprising a capture system as discussed herein.

The gas turbine engine creates exhaust products which may be warm and of a high pressure through combustion of its fuel source. The warm exhaust products, which may comprise the pressurised flue gas, may reduce the effective viscosity of the liquid solvent as it is mixed with the pressurised flue gas in the two-phase atomising nozzle. This may promote the generation of smaller solvent droplets in the atomised solvent spray.

The exhaust gas of the gas turbine engine may comprise a high proportion of constituent carbon dioxide gas. As such, the capture system may be configured to absorb and/or capture carbon dioxide present in an exhaust gas of a gas turbine engine. The carbon dioxide may be naturally occurring, but it will be readily appreciated that the majority of carbon dioxide in the exhaust gas will be a by-product of combustion within the gas turbine engine.

The capture system may be configured to treat the exhaust gas of one or more gas turbine engines.

The capture system of the first aspect or the second aspect may comprise a waste heat recovery unit. The remaining exhaust gas may be passed through the waste heat recovery unit before being passed through the atomised solvent spray. As such, all the exhaust gas may be passed through the atomised solvent spray; either during mixing in the two-phase atomising nozzle and the resultant spray, or from being passed through the atomised solvent spray separately.

The waste heat recovery unit may cool the exhaust gas as necessary before it is passed through the atomised solvent spray. This may prevent evaporation of solvent in the atomised solvent spray.

The waste heat recovery unit may be in thermal contact with a fluid flow. The fluid flow may comprise water, oil, or a mixture thereof. One or more heat exchangers may facilitate heat exchange between the exhaust gas passed through the waste heat recovery unit and the fluid flow. Accordingly, the waste heat recovery unit may be configured to produce hot pressurised water, oil, or a mixture thereof. The pressurised water, oil, or mixture thereof may be used in solvent regeneration.

Advantageously the inclusion of the waste heat recovery unit, which beneficially provides thermal energy for use in solvent regeneration, negates the need for larger, weightier conventional cooling devices such as a conventional direct cooler upstream of the two-phase atomising nozzle. This may reduce the weight and footprint of the capture system.

Whilst the provision of a warm pressurised flue gas is preferred in generating the atomised solvent spray, passing through the remaining heated portion of an exhaust gas through the atomised solvent spray is not preferred; otherwise the hot exhaust gas may heat the liquid solvent (and other liquids, e.g. water) in the capture system, resulting in its evacuation from the system in a gaseous phase rather than its recirculation in a liquid phase.

Cooling of the exhaust gas by the waste heat recovery unit may maintain a safe pressure of pressurised flue gas passing through the two-phase atomising nozzle, such that the two-phase atomising nozzle is not damaged due to too a high pressure across it.

Cooling of the exhaust gas by the waste heat recovery unit may lower the temperature within the capture system such that the reversible capture reaction between the solute (e.g. carbon dioxide) and the solvent is in favour of capture/absorption of the solute.

To minimise the amount of solvent required by the capture system, it is desirable to recirculate any solvent possible from the atomised solvent spray to the solvent source providing liquid solvent. As such, a demister may be provided downstream of the two-phase atomising nozzle. The demister may be configured to condense the atomised solvent spray, such that it pools. The pressurised flue gas may then pass through the demister. Smaller solvent droplets which do not condense in the demister may also pass through the demister with the pressurised flue gas.

The demister may be a chevron vane demister, a mesh-pad demister, a Brownian diffusion demister, or any combination of the above. Additionally and/or alternatively, the demister may be a device with a filter fabric of smaller pores to further separate droplets smaller than those of chevron vane demisters, mesh-pad demisters or Brownian diffusion demisters.

The capture system may comprise a direct contact cooler. The direct contact cooler may be downstream of the two-phase atomising nozzle. The direct contact cooler may condense any solvent which is not condensed by the demister.

The demister may provide a boundary between the two-phase atomising nozzle and the direct contact cooler. The demister may separate the two-phase atomising nozzle and the direct contact cooler.

The direct contact cooler may generally be required to condense smaller droplets in the atomised solvent spray, such that they grow large enough to be separated by the demister. For example, smaller droplets in the atomised solvent spray may be considered as aerosols. Aerosols may be too small to be separated by demisters.

The direct contact cooler may be configured to condense the atomised solvent spray. The direct contact cooler may spray the atomised solvent spray with a co-current water spray. The co-current water spray may cool the atomised solvent spray such that solvent droplets within the spray grow in size (i.e. condense).

The use of a co-current water spray may reduce the pressure drop across the capture system. The use of a co-current water spray may contribute to achieving a total pressure drop across the capture system of 3 kPa, or less than 3 kPa. The use of a co-current water spray may achieve a suitable pressure drop such that a pressurised flue gas source may be suitably used as the motive gas through the capture system and/or through the two-phase atomising nozzle.

A second demister may be provided downstream the direct contact cooler such that the atomised solvent spray then condenses, and passes to the pooled liquid solvent. The remaining pressurised flue gas, treated such that the target solute (e.g. carbon dioxide) is substantially removed from the gas, is exhausted from the capture system, such as via the outlet mentioned above.

To cool the water provided to the water spray such that it may sufficiently cool the atomised solvent spray, the water may be cooled by seawater. To facilitate thermal exchange between the water and the seawater, one or more heat exchangers may be provided.

Whilst seawater is an exemplary cooling fluid which may be found in abundance and is easily accessible for offshore applications, it will be readily appreciated that seawater is just as accessible for onshore applications. Alternatively, other large bodies of water such as rivers and/or lakes may provide adequate supply of water for the cooling components of the capture system if used inland.

The capture system may only require a sole direct contact cooler downstream of the two-phase atomising nozzle. This may reduce the footprint of the capture system, and may reduce the total weight of the capture system. The requirement of only a single direct contact cooler may be realised through the use of, for example, the waste heat recovery unit. As the waste heat recovery unit cools any flue gas passed through the atomised solvent spray which is not provided to the two-phase atomising nozzle, with the heat recovered from the waste heat recovery unit advantageously being utilised in the solvent regeneration process, additional cooling devices are not required before the remaining exhaust gas may be passed through the atomised solvent spray. Accordingly, additional heating devices for solvent regeneration, and additional cooling devices for the exhaust gas, are not required and optionally can be omitted. Further reductions in the weight and footprint of the capture system may hence be realised.

The pooled solvent, and any water which may have been used to wash the atomised solvent spray in the direct contact cooler, may be regarded as a sump volume. The capture device may comprise a sump for holding the solvent and water that make up the sump volume. To recirculate the pooled solvent and water through the capture system, a sump pump may be provided.

The capture system may comprise a solvent regeneration unit. The sump pump may be in fluid communication with a solvent regeneration unit. The solvent regeneration unit may be configured to separate solvent from any solute present in the atomised solvent spray, and optionally from any water. The solute may be carbon dioxide. The solvent separated in the solvent regeneration unit may then be provided as liquid solvent to the two-phase atomising nozzle. As such the solvent source may be the solvent regeneration unit. The solvent regeneration unit may return the water to the direct contact cooler.

Separating water from liquid solvent may ensure a desired concentration of liquid solvent is passed to the two-phase atomising nozzle for generation of the atomised solvent spray, such that efficient solute e.g. carbon dioxide capture may be achieved.

The liquid solvent may be a substance comprising an amine group. For example, the liquid solvent may be monoethanolamine (MEA), piperazine, or mixtures thereof. The liquid solvent may be 20% to 70% weight MEA. The liquid solvent may be 20% to 40% weight MEA. The liquid solvent may be 50% to 70% weight MEA. The liquid solvent may be 10% to 30% weight piperazine.

Other carbon dioxide capturing solvents may be used as appropriate. For example, the liquid solvent may generally be any solvent that can bind carbon dioxide in a reversible reaction, and does not need necessarily be a substance comprising an amine group. These may include carbonate systems, glycols, organic acids, or suspended solutions of microorganisms known for carbon dioxide affinity.

The liquid solvent may be chosen as required to bind a chosen target solute other than carbon dioxide. For example, the solute may be hydrogen sulphide.

The two-phase atomising nozzle may be housed in an absorber. The absorber may be a columnar tank or vat, and may form part of a vertical stack and/or chimney. The time taken for the atomised solvent spray to pass through the absorber may be less than three seconds. The short residence time of the atomised solvent spray may still provide adequate absorption and/or capture of the target solute because the atomised solvent spray provides a large surface area between the solvent and the pressurised flue gas. Accordingly, a higher flow rate of liquid solvent may be provided which increases the amount of carbon dioxide which may be captured from the pressurised flue gas.

The short residence time of the atomised solvent spray may reduce the weight of the capture system, as the recirculation of liquid solvent through the capture system may enable a smaller volume of liquid solvent to be required in the capture system at any given time.

The liquid solvent which has not been in contact with the gas to be treated (pressurised flue gas and/or exhaust gas) may be regarded as lean liquid solvent. The liquid solvent which has been in contact with the gas to be treated may be regarded as rich liquid solvent.

The waste heat recovery unit may be located underneath the absorber. The direct contact cooler may be located above the absorber. Accordingly, the capture system may substantially comprise a vertical stack and/or chimney. The footprint of the capture system may therefore be smaller than that of conventional capture systems.

Viewed from a third aspect, the invention provides an offshore vessel comprising the capture system of the first aspect, optionally comprising the gas turbine of the second aspect, with its integrated capture system.

The offshore vessel may be any vessel suitable for operation at sea. The offshore vessel may be a tanker, a shipping vessel, or another gas turbine engine-powered vessel operated at sea. This may extend to offshore platforms and floating platforms. Similarly the power generation source may be any combustion engine generally producing a pressurised and optionally warm exhaust product which may be used as the pressurised flue gas.

The offshore vessel may be configured to use seawater to cool the capture system. As will be appreciated, the offshore vessel, being offshore, will be surrounded by seawater and thus an abundance of seawater will be available to be used as a coolant for the capture system.

Seawater cooling may be used at a number of locations around the capture system, in accordance with the first aspect and/or the second aspect of the present invention. For example, seawater may be used to cool the water used in the water spray of the direct contact cooler. Seawater may be used to cool the liquid solvent provided to the two-phase atomising nozzle. By utilising seawater from the environment surrounding an offshore vessel, or the capture system for offshore carbon dioxide capture, sufficient cooling may be provided to dissipate the large amount of heat generated during operation of the capture system. The use of seawater also negates the need for further cooling systems or coolants in the system, which may otherwise demand a substantial amount of energy to operate.

Whilst seawater is an exemplary cooling fluid which may be found in abundance and is easily accessible for offshore applications, it will be readily appreciated that seawater is just as accessible for onshore applications. Alternatively, other large bodies of water such as rivers and/or lakes may provide adequate supply of water for the cooling components of the capture system if used inland.

Viewed from a fourth aspect, the invention provides a method for offshore carbon dioxide capture, the method comprising: providing pressurised flue gas to a two-phase atomising nozzle; providing liquid solvent to the two-phase atomising nozzle; and generating an atomised solvent spray of the liquid solvent using the two-phase atomising nozzle; wherein the two-phase atomising nozzle is configured for two-phase flow of a mixture of the pressurised flue gas and the liquid solvent in order to generate the atomised solvent spray of the liquid solvent.

It is well understood that increasing a solvent-gas contact area between a solvent and a solute may increase the ability of the solvent to dissolve and/or absorb a solute or other target compound. Generating an atomised solvent spray using the two-phase atomising nozzle negates the need to place a conventional scrubber column in the capture system, as the generated atomised solvent spray has a large surface area by which to capture and/or absorb the target gas. Accordingly, given the lack of a conventional scrubber column, a larger pressure drop is observed across the capture system. The pressure drop across the two-phase atomising nozzle may be in the region of 3 kPa, or less than 3 kPa. The pressure required by a motive gas configured to drive the solvent through the capture system and hence the two-phase atomising nozzle is decreased, and thus the pressurised flue gas (e.g. produced by a gas turbine engine or other known pressurised flue gas source) is of suitable pressure to perform the function of the motive gas.

Thus by providing the pressurised flue gas source in flow communication with the two-phase atomising nozzle, a separate gas source is not needed to drive the solvent provided by the solvent source through the two-phase atomising nozzle. Consequentially, the weight and footprint of the capture system may be reduced.

By requiring that the pressurised flue gas is provided to the two-phase atomising nozzle which generates an atomised solvent spray, contact between the pressurised flue gas and the solvent may be increased. This may result in a higher efficiency of capture of gas, for example carbon dioxide, from the pressurised flue source by the solvent in the atomised solvent spray.

It will be readily appreciated that the two-phase flow of the mixture of the pressurised flue gas and the liquid solvent will be co-current in order to generate the atomised solvent spray of the liquid solvent. A conventional scrubber column may have multiple solvent compounds in its column packing which allow for multiple equilibrium steps in the capture/absorbance of the target solute/gas to be treated. Whilst a capture system using a two-phase atomising nozzle may have fewer equilibrium steps in its capture/absorbance process, the co-current flow of the atomised solvent spray and the pressurised flue gas may produce a larger solvent-gas contact area such that the system may compensate for the reduced number of equilibrium steps.

The capture system for offshore carbon dioxide capture may be suitable for offshore applications due to its compact (i.e. small footprint), lightweight and efficient nature. However it will be readily appreciated that such a system could be implemented onshore as well as offshore.

Whilst generally referred to as a solvent in the context of gas capture, the liquid solvent does not necessarily dissolve the pressurised flue gas (e.g. comprising carbon dioxide), which may be referred to as a solute in the present context. As will readily be appreciated by the skilled person, the solvent bonds with the solute in a reversible reaction. During absorption/capture, the equilibrium is positioned such that the amount of solute captured is maximised.

The method may comprise driving the liquid through the two-phase atomising nozzle using the pressurised flue gas.

Generating the atomised solvent spray may comprise generating solvent droplets with a droplet diameter of 150 μm or less, optionally 100 μm or less, such as droplets with diameters from 25 μm to 150 μm or diameters between 50 μm and 100 μm. Thus the diameter of the droplets may be of such a value that the surface area to volume ratio of the solvent droplets in the atomised solvent spray may increase the efficiency of capture and/or absorption of a target solute, e.g. carbon dioxide, from the pressurised flue gas.

The pressurised flue gas may be generally warm (i.e. at a temperature above a standard ambient temperature of 298

K). The warmth of the pressurised flue gas may reduce an effective viscosity of the liquid solvent during mixing in the two-phase atomising nozzle. This may promote the generation of smaller solvent droplets in the atomised solvent spray.

The method of carbon capture may comprise using a main flow path for flue gas from which it is desired to capture carbon dioxide. Thus, there may be an inlet to the main flow path, which is upstream of the two-phase atomising nozzle, and an outlet from the main flow path, which is downstream of the two-phase atomising nozzle. Flue gas (exhaust gas) may enter the inlet and flow past the two-phase atomising nozzle, being exposed to the atomised solvent spray, before passing to the outlet. Accordingly, the method may comprise the steps of passing flue gas through an inlet, exposing the flue gas to the atomised solvent spray, and passing the exposed flue gas through an outlet. The capture system may comprise further elements between the inlet and outlet as discussed below.

The pressurised flue gas source may be a gas turbine engine. Pressure generated by the gas turbine engine may provide pressurisation for the flue gas source, for example through back-pressure of the engine's exhaust. This avoids the need for a further pressure source, such as a pump, fan, blower or a compressor. However it will be readily appreciated that the pressurised flue gas source may be a pump, fan, blower or compressor configured to pressurise and optionally warm ambient air or other suitable sources in place of the gas turbine engine. Additionally, the pressurised flue gas source could be any combustion engine generally producing a pressurised and optionally warm exhaust product which may be used as the pressurised flue gas.

The method may comprise taking, dividing and/or splitting one or more flows of pressurised flue gas from an exhaust of a gas turbine engine. For example, with the exhaust gas divided into two or more parts, with one part providing pressurised flue gas for the two-phase nozzle and another part (which may be the remainder) flowing through the main flow path, such as between the inlet and the outlet discussed above, in order to provide treatment of the exhaust gas. As such the method may comprise passing the taken, divided and/or split flow of exhaust gas through the atomised solvent spray.

The method may be for a gas turbine engine and hence, in a fifth aspect, the invention may provide a method for offshore carbon capture for a gas turbine engine as discussed herein.

The gas turbine engine creates exhaust products which may be warm and of a high pressure through combustion of its fuel source. The warm exhaust products, which may comprise the pressurised flue gas, may reduce the effective viscosity of the liquid solvent as it is mixed with the pressurised flue gas in the two-phase atomising nozzle. This may promote the generation of smaller solvent droplets in the atomised solvent spray.

The exhaust gas of the gas turbine engine may comprise a high proportion of constituent carbon dioxide gas. As such, the method may comprise absorbing and/or capturing carbon dioxide present in an exhaust gas of a gas turbine engine. The carbon dioxide may be naturally occurring, but it will be readily appreciated that the majority of carbon dioxide in the exhaust gas will be a by-product of combustion within the gas turbine engine.

The method may involve treating the exhaust gas of one or more gas turbine engines.

The method of the fourth aspect or the fifth aspect may comprise using a waste heat recovery unit. The method may comprise passing the remaining exhaust gas through a waste heat recovery unit before passing the remaining exhaust gas through the atomised solvent spray. As such, the method may comprise passing all the exhaust gas through the atomised solvent spray; either during mixing in the two-phase atomising nozzle and the resultant spray, or by passing it through the atomised solvent spray separately. The method may comprise cooling, using the waste heat recovery unit, the exhaust gas as necessary before it is passed through the atomised solvent spray. This may prevent evaporation of solvent in the atomised solvent spray.

The waste heat recovery unit may be in thermal contact with a fluid flow. The fluid flow may comprise water, oil, or a mixture thereof. One or more heat exchangers may facilitate heat exchange between the exhaust gas passed through the waste heat recovery unit and the fluid flow. Accordingly, the method may comprise producing, using the waste heat recovery unit, hot pressurised water, oil, or a mixture thereof. The pressurised water, oil, or mixture thereof may be used in solvent regeneration.

Advantageously the inclusion of the waste heat recovery unit, which beneficially provides thermal energy for use in solvent regeneration, negates the need for larger, weightier conventional cooling devices such as a conventional direct contact cooler upstream of the two-phase atomising nozzle. This may reduce the weight and footprint of the capture system.

Whilst the provision of a warm pressurised flue gas is preferred in generating the atomised solvent spray, passing through the remaining heated portion of an exhaust gas through the atomised solvent spray is not preferred; otherwise the hot exhaust gas may heat the liquid solvent (and other liquids, e.g. water) in the capture system, resulting in their evacuation from the system in a gaseous phase rather than their recirculation in a liquid phase.

Cooling of the exhaust gas by the waste heat recovery unit may maintain a safe pressure of pressurised flue gas passing through the two-phase atomising nozzle, such that the two-phase atomising nozzle is not damaged due to too a high pressure across it.

Cooling of the exhaust gas by the waste heat recovery unit may lower the temperature within the capture system such that the reversible capture reaction between the solute (e.g. carbon dioxide) and the solvent is in favour of capture/ absorption of the solute.

To minimise the amount of solvent required in the method, it is desirable to recirculate any solvent possible from the atomised solvent spray to the solvent source providing liquid solvent. As such, a demister may be provided downstream of the two-phase atomising nozzle. The method may therefore comprise passing the atomised solvent spray through a demister downstream of the two-phase atomising nozzle. The demister may be configured to condense the atomised solvent spray, such that it pools. The method may comprise condensing the atomised solvent spray. The pressurised flue gas may also pass through the demister. Smaller solvent droplets which do not condense in the demister may also pass through the demister with the pressurised flue gas.

The demister may be a chevron vane demister, a mesh-pad demister, a Brownian diffusion demister, or any combination of the above. Additionally and/or alternatively, the demister may be a device with a filter fabric of smaller pores to further separate droplets smaller than those of chevron vane demisters, mesh-pad demisters or Brownian diffusion demisters.

The method may comprise the use of a direct contact cooler. The direct contact cooler may condense any solvent which is not condensed by the demister. The direct contact cooler may be downstream the two-phase atomising nozzle.

The demister may provide a boundary between the two-phase atomising nozzle and the direct contact cooler. The demister may separate the two-phase atomising nozzle and the direct contact cooler.

The direct contact cooler may generally be required to condense smaller droplets in the atomised solvent spray, such that they grow large enough to be separated by the demister. For example, smaller droplets in the atomised solvent spray may be considered as aerosols. Aerosols may be too small to be separated by demisters.

Thus the method may comprise condensing, using a direct contact cooler, the atomised solvent spray. The direct contact cooler may spray the atomised solvent spray with a co-current water spray. The method may therefore comprise the step of spraying the atomised solvent spray with a co-current water spray. The co-current water spray may cool the atomised solvent spray such that solvent droplets within the spray grow in size (i.e. condense).

The use of a co-current water spray may reduce the pressure drop across the capture system. The use of a co-current water spray may contribute to achieving a total pressure drop across the capture system of 3 kPa, or less than 3 kPa. The use of a co-current water spray may achieve a suitable pressure drop such that a pressurised flue gas source may be suitably used as the motive gas through the capture system and/or through the two-phase atomising nozzle.

A second demister may be provided downstream the direct contact cooler such that the atomised solvent spray then condenses, and passes to the pooled liquid solvent. The remaining pressurised flue gas, treated such that the target solute (e.g. carbon dioxide) is substantially removed from the gas, is exhausted, such as via the outlet mentioned above.

To cool the water provided to the water spray such that it may sufficiently cool the atomised solvent spray, the water may be cooled by seawater. To facilitate thermal exchange between the water and the seawater, one or more heat exchangers may be provided.

Whilst seawater is an exemplary cooling fluid which may be found in abundance and is easily accessible for offshore applications, it will be readily appreciated that seawater is just as accessible for onshore applications. Alternatively, other large bodies of water such as rivers and/or lakes may provide adequate supply of water for the cooling components of the capture system if used inland.

The method may only require a sole direct contact cooler downstream of the two-phase atomising nozzle. This may reduce the footprint of the apparatus required by the method, and may reduce the total weight of the capture system. The requirement of only a single direct contact cooler may be realised through the use of, for example, the waste heat recovery unit. As the waste heat recovery unit cools any flue gas passed through the atomised solvent spray which is not provided to the two-phase atomising nozzle, with the heat recovered from the waste heat recovery unit advantageously being utilised in the solvent regeneration process, additional cooling devices are not required before the remaining exhaust gas may be passed through the atomised solvent spray. Accordingly, additional heating devices for solvent regeneration, and additional cooling devices for the exhaust gas, are not required and optionally can be omitted. Further reductions in the weight and footprint of the capture system may hence be realised.

The pooled solvent, and any water which may have been used to wash the atomised solvent spray in the direct contact cooler, may be regarded as a sump volume. The method may require holding the solvent and water that make up a sump volume. To recirculate the pooled solvent and water through the capture system, a sump pump may be provided.

The method may comprise using a solvent regeneration unit. The sump pump may be in fluid communication with a solvent regeneration unit. The solvent regeneration unit may be configured to separate solvent from any solute present in the atomised solvent spray, and optionally from any water. Hence the method may comprise the step of separating solvent from any solute present in the atomised solvent spray, and optionally from any water. The solute may be carbon dioxide. The solvent separated in the solvent regeneration unit may then be provided as liquid solvent to the two-phase atomising nozzle. As such the solvent source may be the solvent regeneration unit. The solvent regeneration unit may return the water to the direct contact cooler.

Separating water from liquid solvent may ensure a desired concentration of liquid solvent is passed to the two-phase atomising nozzle for generation of the atomised solvent spray, such that efficient solute e.g. carbon dioxide capture may be achieved.

The liquid solvent may be a substance comprising an amine group. For example, the liquid solvent may be mono-ethanolamine (MEA), piperazine, or mixtures thereof. The liquid solvent may be 20% to 70% weight MEA. The liquid solvent may be 20% to 40% weight MEA. The liquid solvent may be 50% to 70% weight MEA. The liquid solvent may be 10% to 30% weight piperazine.

The liquid solvent may generally be any solvent that can bind carbon dioxide in a reversible reaction, and does not need necessarily be a substance comprising an amine group. For example, carbonate systems, glycols, organic acids, or solutions with microorganisms known for carbon dioxide affinity, could all be used.

The liquid solvent may be chosen as required to bind a chosen target solute other than carbon dioxide. For example, the solute may be hydrogen sulphide.

The two-phase atomising nozzle may be housed in an absorber. The absorber may be a columnar tank or vat, and may form part of a vertical stack and/or chimney. The time taken for the atomised solvent spray to pass through the absorber may be less than three seconds. The short residence time of the atomised solvent spray may still provide adequate absorption and/or capture of the target solute because the atomised solvent spray provides a large surface area between the solvent and the pressurised flue gas. Accordingly, a higher flow rate of liquid solvent may be provided which increases the amount of carbon dioxide which may be captured from the pressurised flue gas.

The short residence time of the atomised solvent spray may reduce the weight of the capture system, as the recirculation of liquid solvent through the capture system may enable a smaller volume of liquid solvent to be required in the capture system at any given time.

The liquid solvent which has not been in contact with the gas to be treated (pressurised flue gas and/or exhaust gas) may be regarded as lean liquid solvent. The liquid solvent which has been in contact with the gas to be treated may be regarded as rich liquid solvent.

The waste heat recovery unit may be located underneath the absorber. The direct contact cooler may be located above the absorber. Accordingly, the method may substantially be performed within a vertical stack and/or chimney. The footprint of the apparatus required for performing the method may therefore be smaller than that of conventional capture methods.

The method of the fourth and fifth aspects may have one or more steps corresponding to the use of features of the first and second aspects. Thus the above description of the apparatus of the first aspect, including but not limited to all technical advantages and alternative embodiments, may be equally applicable to the method of the second aspect.

The method of the fourth aspect may performed by the capture system for offshore carbon dioxide capture of the first aspect. As such the method may be a method of capture for offshore carbon dioxide capture of the first aspect.

The method of the fifth aspect may be performed by the gas turbine engine of the second aspect. As such the method may be a method of capture for offshore carbon dioxide using the gas turbine engine of the second aspect.

Certain example embodiments of the invention will now be described by way of example only and with reference to the accompanying drawings in which.

Figure 1A:
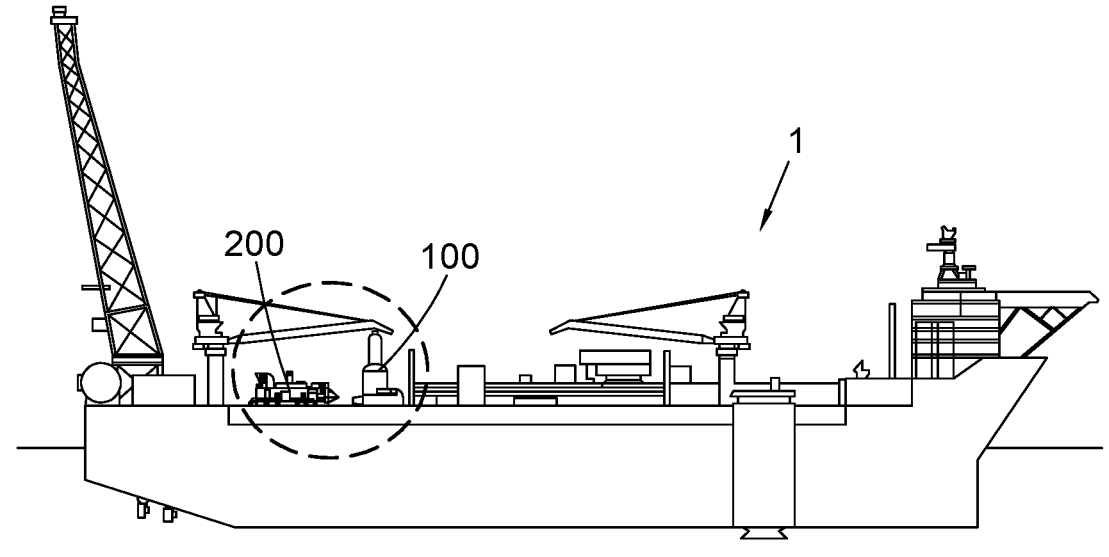
FIG. 1A shows a vessel with a carbon capture system installed on board.

FIG. 1A shows a vessel 1. Whilst the vessel 1 as illustrated resembles a ship, it is to be appreciated that the vessel 1 may be any marine-based platform, such as a floating oil rig, a static oil rig, or a ship and/or boat of any size. Installed on board the vessel 1 is a carbon dioxide capture system 100 (herein referred to as capture system 100) and a gas turbine engine 200. The capture system 100 and the gas turbine engine 200 shown installed on the vessel 1 are proportionally representative of the footprint they may occupy on the vessel 1. The gas turbine engine 200 may comprise one or more gas turbines used, for example, for providing a thrust via a propeller to propel the vessel 1 as required, or for the generation of electrical power to one or more components of the floating vessel 1.

Figure 1B:
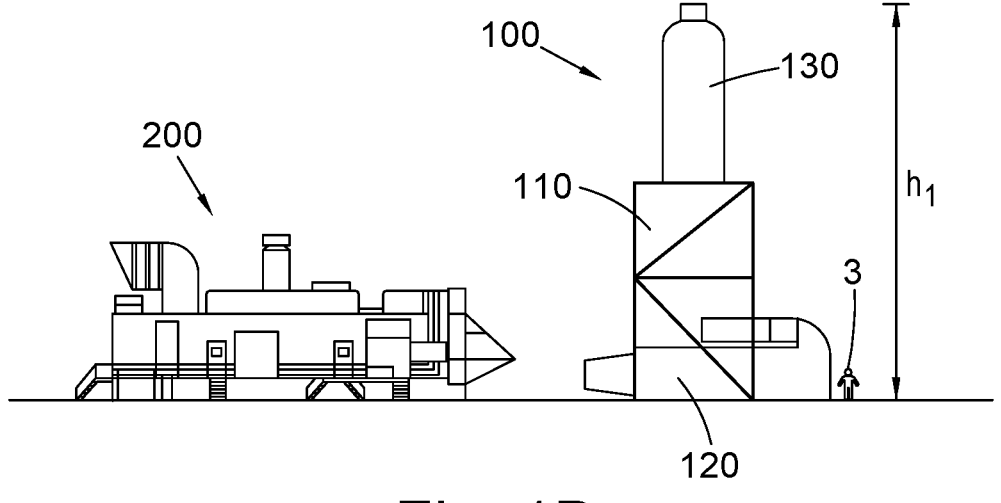
FIG. 1B shows a proportionally representative view of a carbon capture system and a gas turbine engine of the vessel of FIG. 1A.

FIG. 1B is a more detailed representation of the capture system 100 and the gas turbine engine 200 installed on the vessel 1 of FIG. 1, as encircled. A person 3 is shown next to the capture system 100. The person 3 is proportionally representative of the size of the capture system 100. The capture system 100 comprises a substantially narrow, vertical profile. Accordingly, the width of the base of the capture system may be 12 m and the height hi of the capture system may be 20 m. Whilst not shown in FIG. 1A, the capture system 100 is in flow communication with an exhaust of the gas turbine engine.

The capture system 100 as illustrated in FIG. 1A comprises three general sections. At the base of the capture system 100 there is a waste heat recovery unit (WHRU) 120. On top of the WHRU 120 is an absorber 110. Placed on top of the absorber 110 is a direct contact cooler 130. The direct contact cooler 130 may comprise a water wash. Whilst not shown in FIG. 1B, the capture system 100 may also comprise a solvent regeneration unit 140. The absorber 110 may have a diameter of 7 m, and a height of 11 m. By stacking the components of the capture system 100 on top of one another in a generally vertical fashion, the footprint of the capture system 100 on board the vessel 1 may be reduced.

Figure 2:
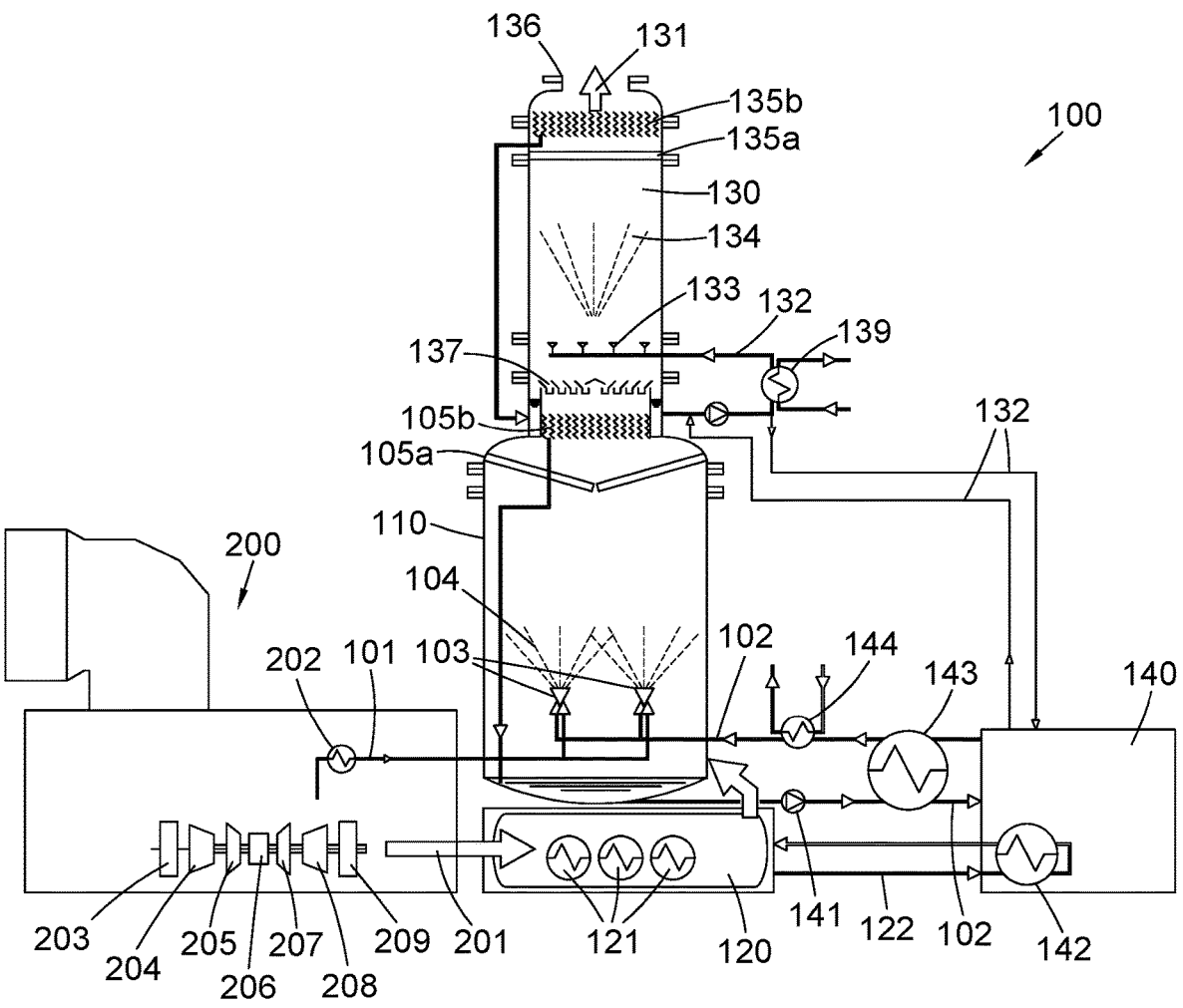
FIG. 2 illustrates a schematic diagram of carbon capture system.

FIG. 2 shows a schematic diagram of the capture system 100 in flow communication with the gas turbine engine 200. The capture system 100 removes carbon dioxide from a flue gas, such as a pressured flue gas 101, by treating it with a liquid solvent 102. To maximise the efficiency of the capture process, a two-phase atomising nozzle 103 facilitates a mixing of a pressurised flue gas 101 and a liquid solvent 102 by generating an atomised solvent spray 104, as described herein.

The pressurised flue gas 101 is provided to a two-phase atomising nozzle 103. The pressurised flue gas 101 is in a gaseous phase. A liquid solvent 102 is also provided to the two-phase atomising nozzle 103. The liquid solvent 102 is a lean solvent; that is, the liquid solvent 102 provided to the two-phase atomising nozzle 103 is not loaded with solute. The two-phase atomising nozzle 103 generates an atomised solvent spray 104. The atomised solvent spray 104 comprises a mixture of the pressurised flue gas 101 and the liquid solvent 103.

The pressurised flue gas 101 is of sufficient pressure such that the liquid solvent 102 is driven through the two-phase atomising nozzle 103 to produce the atomised solvent spray 104. Sufficient pressure herein is defined as a pressure greater than the pressure of treated gas 131 exhausted from the capture system 100 via the direct contact cooler 130, such that the liquid solvent 102 is motivated through the two-phase atomising nozzle 103 to produce the atomised solvent spray 104. Accordingly, the pressurised flue gas may be of a pressure greater than that of the treated gas 131 by 6 kPa or less, 5 kPa or less, or 3 kPa or less, as required.

The pressurised flue gas 101, as well as being of sufficient pressure to drive the liquid solvent 102 through the two-phase atomising nozzle 103, is also of sufficient pressure to generate droplets of liquid solvent 102 in the atomised solvent spray 104 which have a droplet diameter of less than 150 μm, less than 100 μm, or with diameters from 25 μm to 150 μm, or with diameters from 50 μm to 100 μm, as it drives the liquid solvent 102 through the two-phase atomising nozzle 103. The droplet diameter may be defined according to the Sauter mean particle diameter.

The capture of carbon dioxide from the pressurised flue gas 101 is enhanced by the two-phase atomising nozzle 103 as the produced atomised solvent spray comprises a number of solvent droplets which increase the effective surface area of the liquid solvent 102. As such, and as will be readily understood by the skilled person, a large contact surface is provided between the liquid phase, i.e. the liquid solvent 102, and the gaseous phase, i.e. the pressurised flue gas 101, such that capture and/or absorption of carbon dioxide from the gaseous phase is increased. A co-current flow between the pressurised flue gas 101 and the atomised solvent spray 104 may also increase the time in which the pressurised flue gas 101 and the atomised solvent spray 104 are in contact, thus increasing the capture and/or absorption of carbon dioxide from the gaseous phase.

Whilst two two-phase atomising nozzles 103 are shown in FIG. 2, the capture system may comprise one or more two-phase atomising nozzles 103 as necessary. For example, the two-phase atomising nozzle 103 may be a battery of 220 or more two-phase atomising nozzles 102. The two-phase atomising nozzles 103 are appreciably lighter in weight than conventionally used solid packed solvent. Accordingly, the use of two-phase atomising nozzles 103 within the capture system 100 may reduce the weight of the capture system 100.

The two-phase atomising nozzle 103 is housed in a large vat or tank. This may be referred to as the absorber 110, and is where the treatment of the pressurised flue gas 101 by the atomised solvent spray 104 occurs. So that the pressurised flue gas 101 treated by the capture system 100 (herein treated gas 131) may be exhausted from the system, whilst liquid solvent is recycled and/or reused by the capture system 100, one or more demisters 105 may be placed in the absorber 110 downstream of the atomised solvent spray 104. The demisters 105 may be mesh-pad demister 105a and a chevron vane demister 105b. Whilst a mesh-pad demister 105a and a chevron vane demister 105b are shown herein, any combination or number of demisters 105 may be implemented as required. For example, the demisters could be a Brownian diffusion demister, or a device with a filter fabric of smaller pores to further separate droplets smaller than those of chevron vane demisters, mesh-pad demisters or Brownian diffusion demisters.

The demisters 105 condense larger droplets of the atomised solvent spray 104, whilst smaller droplets may pass through given their size. The treated gas 131 passes through the demisters 105. The atomised solvent spray 104 which is condensed pools at the base of the absorber 110, upstream of the two-phase atomising nozzle 103. The condensed atomised solvent spray 104 forms a sump volume 106. The sump volume 106 comprises a mixture of condensed liquid solvent 102 that has captured carbon dioxide from the pressurised flue gas 101. As such it may be regarded as 'loaded', and is thus rich solvent. The sump volume 106 may also comprise liquid water.

The smaller droplets of liquid solvent 102 which are not condensed in the demisters 105 of the absorber 110 are carried by the pressurised flue gas 101 into a direct contact cooler 130. The direct contact cooler 130 is housed in a columnar tank and/or vat, stacked on top of the absorber 110. The direct contact cooler 130 is downstream of the absorber, and is separated from the absorber by the demisters 105. The direct contact cooler 130 comprises an outlet 136 by which the treated gas 131 is exhausted from the capture system 100.

Advantageously, the capture system 100 may only require a single direct contact cooler 130, located downstream of the two-phase atomising nozzle 103. As the two-phase atomising nozzle 103 negates the need for the conventional packed solvent used in the prior art, a direct contact cooler 130 is not required to cool the pressurised flue gas 101 before it meets a packed solid solvent. Accordingly, the weight and footprint of the capture system 100 may be reduced. Whilst only a single direct contact cooler 130 may be required and is shown in the capture system 100 of FIG. 2, more than one direct contact cooler 130 may be implemented in the capture system 100.

One or more water spray nozzles 133 are located in the direct contact cooler 130, which receive liquid water 132 and generate a water wash 134 comprising the liquid water 132. The water wash 134 is co-current with the treated gas 131 and the smaller droplets of liquid solvent 102 which pass through the direct contact cooler 130. Accordingly, the smaller droplets of liquid solvent 102 of the atomised solvent spray 104 which pass into the direct contact cooler 130 are passed through the co-current water wash 134. The use of a co-current water wash 134 may reduce the pressure drop across the capture system 100 such that the pressurised flue gas source 101 may be of suitable pressure to be the motive gas for the two-phase atomising nozzle 103.

The liquid water 132 in the co-current water wash 134 causes the smaller droplets of liquid solvent 102 to form larger droplets. The larger droplets of liquid solvent 102 then condense, as does the water 132, in a series of demisters 135 located at the outlet 136 of the direct contact cooler 130. As with the absorber 110, the demisters 135 may be a mesh pad demister 135a and a chevron vane demister 135b. Any number and type of demisters 135 may be implemented as required. The condensed liquid solvent 102, which typically rich (i.e. 'loaded') solvent, and condensed liquid water 132, is collected by a vane collector 137 and passes into the absorber 110, where it pools at the base in the sump volume 106.

Some of the liquid water 132 present in the co-current water wash 134 may be collected at the vane collector 137 and pumped, via a pump 138, back to the water spray nozzles 133. Before being passed back to the water spray nozzles 133, the liquid water 132 may be passed through a heat exchanger 138. The heat exchanger 138 cools the liquid water 132 such that the water wash 134 is cool enough to sufficiently condense the liquid solvent 102. The heat exchanger 139 may use seawater to cool the liquid water 132.

The sump volume 106, comprising rich liquid solvent 102 and any liquid water 132 from the direct contact cooler 130 or otherwise, is passed from the absorber 110 to a solvent regeneration unit 140 via a sump pump 141. The liquid solvent 102 and liquid water 132 may pass through a solvent heat exchanger 143, where rich liquid solvent 102 exchanges heat with lean liquid solvent 102 generated by the solvent regeneration unit 140. The rich liquid solvent 102 is heated by the lean liquid solvent 102 in the solvent heat exchanger 143, such that less energy is required by the solvent regeneration unit 140 in regenerating lean liquid solvent 102 from the rich liquid solvent 102.

The solvent regeneration unit 140 recycles rich liquid solvent 102, loaded with captured carbon dioxide from the pressurised flue gas 101, by stripping the liquid solvent 102 of said captured carbon dioxide. The solvent regeneration process may be performed by any known conventional process for releasing the captured carbon dioxide from the liquid solvent. For example, a number of reboilers and structured packing could be configured to selectively desorb carbon dioxide. Generally, the solvent regeneration process may adjust the equilibrium of the capture process such that carbon dioxide is released in a gaseous form. It may then be stored used conventional carbon dioxide storage methods. The stripped, i.e. lean, liquid solvent 102 is then returned to the two-phase atomising nozzle 103. In this respect, the solvent regeneration unit 140 may therefore be regarded as a liquid solvent source. The liquid solvent 102 provided from the solvent regeneration unit 140, having passed through the solvent heat exchanger 143 is passed through an additional heat exchanger 144. The heat exchanger 144 cools the liquid solvent 102 using seawater. Cooling the liquid solvent 102 before passing it to the two-phase atomising nozzle 103 may help prevent the evaporation of the liquid solvent 102 as it is atomised into the liquid droplets forming the atomised solvent spray 104.

The use of seawater cooling at various instances of the capture system 100 may reduce the energy demands of the capture system 100. As the capture system 100 is installed on a vessel 1, there is an abundance of seawater available which may cool the various components of the capture system 100 as required. The seawater, once heated, need not be cooled by additional cooling devices. Instead, a constant flow of seawater from the surrounding environment may instead be used. Accordingly, the use of seawater may increase the energy efficiency of the capture system 100.

Whilst seawater is discussed in relation to the present embodiment, it will be readily understood that any large body of water could provide an abundance of cooling water for used in the capture system 100. As such the capture system 100 could be utilised onshore nearby a river, lake or other appropriate water source.

The solvent regeneration unit 140 also separates liquid water 132 from the liquid solvent 102, and returns the liquid water 102 to the direct contact cooler 130. Heat required for the solvent regeneration process may also be provided by pressurised water and/or oil 122. The heat from the pressurised water and/oil 122 is transferred to the solvent regeneration unit 140 using a heat exchanger 142.

The capture system 100 also comprises the WHRU 120. The WHRU 120 is located beneath the absorber 110. Exhaust gas 201 is taken, split and/or divided from the pressurised flue gas 101 and passed through the WHRU 120. The exhaust gas 201 passed through the WHRU 120 may be an excess of pressurised flue gas 101 which may not all be passed through the two-phase atomiser nozzle 103 without undesirable flow effects, such as turbulence, or pressure build-ups, occurring. The WHRU 120 comprises a number of heat exchangers 121. The WHRU 120 may comprise any number of heat exchangers 121 as required. The heat exchangers 121 transfer heat from the exhaust gas 201 to pressurised water and/or oil 122. The pressurised water and/or oil 122 then transfers the heat to the solvent regeneration unit 140, for use in the solvent generation process. Accordingly, heat which may otherwise be regarded as a waste product is used in a different, advantageous element of the capture system 100.

The exhaust gas 201 which has had waste heat extracted from it via the one or more heat exchangers 120 is then passed through the absorber 110. The exhaust gas 201 is passed through the atomised solvent spray 104, along with the pressurised flue gas 101 which is passed directly through the atomised solvent spray 104 via the two-phase atomising nozzle 103. As such the exhaust gas 201 may also be treated and have carbon dioxide present in it captured by the liquid solvent 102. Accordingly, the treated gas 131 comprises the pressurised flue gas 101 passed through the atomised solvent spray 104 via the two-phase atomising nozzle and the exhaust gas 201 passed through the atomised solvent spray 104 via the WHRU 120.

As will be appreciated by the skilled person, whilst only the pressurised flue gas 101 passed to the two-phase atomising nozzle 103 drives the liquid solvent 102 through the two-phase atomising nozzle 103 to generate the atomised solvent spray 104, both the pressurised flue gas 101 and the exhaust gas 201 act as the flue gas for the capture system downstream of the absorber 110, given that both may be regarded as the treated gas 131 once they have been passed through the atomised solvent spray 104. Whilst referred to as a flue gas, the pressurised flue gas 101 and/or the exhaust gas may also be regarded as a motive gas.

The pressurised flue gas 101 and the exhaust gas 201 shown in FIG. 2 are provided to the absorber 110 and the WHRU 120 respectively by the gas turbine engine 200. In this respect, the gas turbine engine 200 may be regarded as a pressurised flue gas source. The gas turbine engine 200 comprises a heat exchanger 202, the heat exchanger 202 configured to cool the pressurised flue gas 101 before it is provided to the two-phase atomising nozzle 103.

As illustrated in FIG. 2, the gas turbine engine 200 comprises an air inlet 203 such as a fan, a low pressure compressor 204, a high pressure compressor 205, a combustor 206, a low pressure turbine 207, a high pressure turbine 208, and an air outlet 209. The structure of the gas turbine engine 200 need not be limited to the structure shown in FIG. 2, but may be any gas turbine engine 200 which is capable of producing a sufficiently pressurised flue gas source 101. The pressure of the pressurised flue gas source 101 may for example be provided by a back-pressure of the exhaust product of the gas turbine engine 200. The compressors 204, 205 present in the gas turbine engine 200 may provide the pressure required for the pressurised flue gas source 101. Whilst described herein as a pressurised flue gas source 101, separate to an exhaust gas 201 provided to the WHRU 120, it is to be appreciated that the pressurised flue gas 101 may also be the exhaust product of the gas turbine engine 200.

The pressurised flue gas source 101 need not necessarily be a gas turbine engine 200. The pressurised flue gas source 101 could be any combustion engine or other engine producing compounds such as carbon dioxide. Alternatively, a compressor, fan, blower or pump could be utilised to treat ambient air (i.e. at standard temperature and standard pressure) by pressurising and/or warming it, before passing it to the two-phase atomising nozzle 103.

Figure 3A:
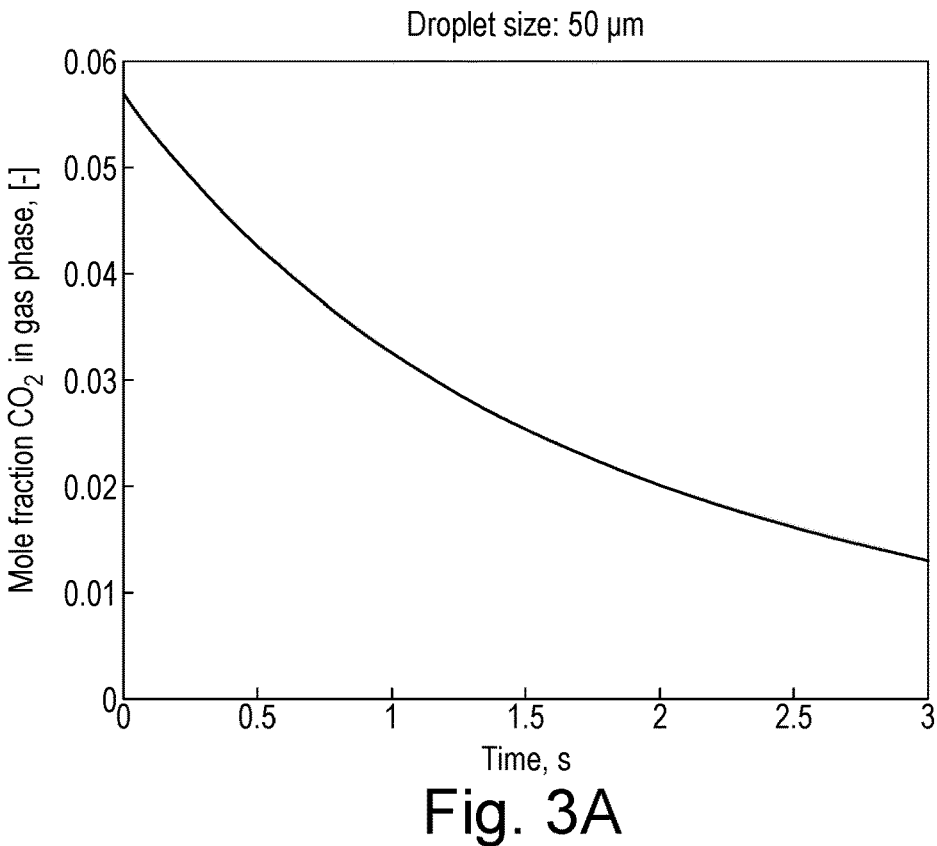
FIG. 3A shows a simulated graph of carbon dioxide concentration in a flue gas in a carbon capture system as a function of time.
Figure 3B:
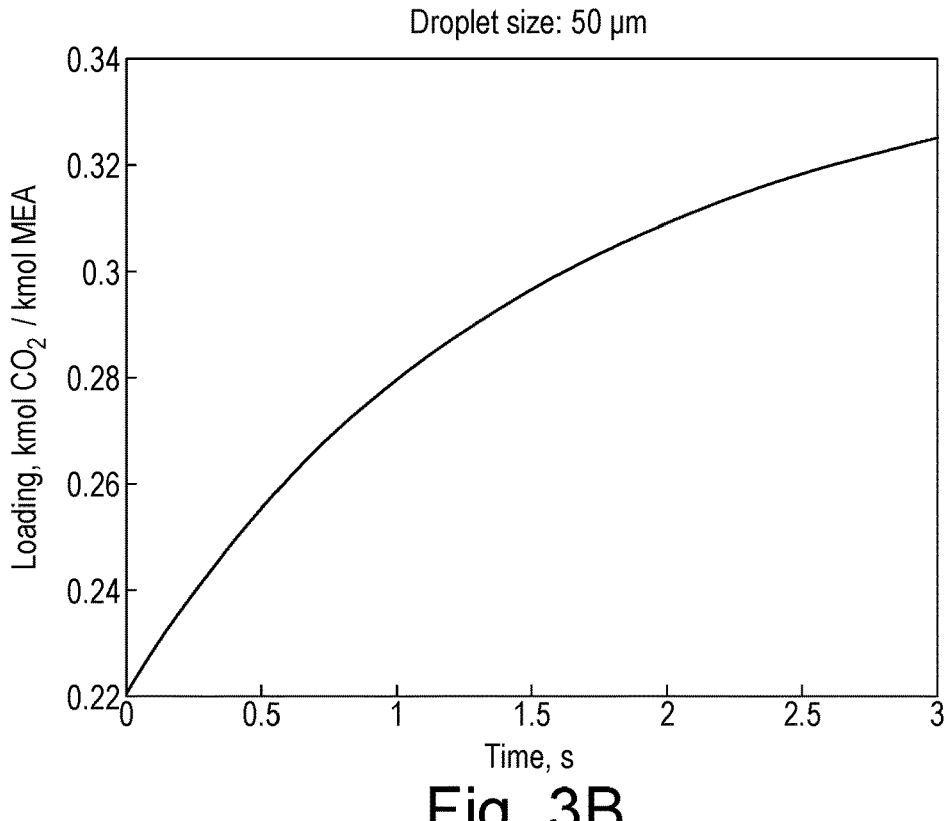
FIG. 3B shows a simulated graph of a carbon dioxide concentration in a liquid solvent in a carbon capture system as a function of time.

FIGS. 3A and 3B illustrate different simulated variables for a simulation of the capture system 100. FIG. 3A shows how the carbon dioxide concentration in the pressurised flue gas 101 reduces as it is treated by the atomised solvent spray 104 and becomes treated gas 131. FIG. 3B shows how the carbon dioxide content of the liquid solvent 102 increases as the pressurised flue gas 101 and the exhaust gas 201 are passed through the atomised solvent spray. Table 1 shows a list of pre-determined input variables used to simulate the capture system 100.

TABLE 1

Input variables for a simulation of the capture system 100.

| | |
|---|---|
| Solvent | 30% wt MEA |
| Liquid/gas ratio | 3 kg/kg |
| Droplet diameter | 50 µm |
| Temperature | 45° C. |
| Residence time | 3 s |
| Initial loading | 0.22 kmol $CO_2$/kmol MEA |
| Initial $CO_2$ concentration | 5.7% |

Whilst the simulation was performed for a liquid solvent 102 comprising 30% wt monoethanolamine (MEA), piperazine or mixtures thereof may also be used as the liquid solvent 102. Similarly, the mixture may be 20% wt MEA, 60% wt MEA, or any other weight percentage of MEA which achieves a similar capture rate. The simulation also assumes that there is a co-current gas-liquid flow of droplets in the atomised solvent spray 104 and of the pressurised flue gas 101.

As shown in FIGS. 3A and 3B, as the gas interacts with the droplet over the course of the 3 second residence time carbon dioxide is captured from the gas and loads the solvent droplet. The efficiency of the capture system 100, for this base simulation, is around 75% carbon dioxide capture.

The capture system 100 may hence be capable of efficiently capturing carbon dioxide from a flue gas. The environmental advantages of removing carbon dioxide are well understood and as such the capture system 100 may be regarded as capable of advantageously reducing the environmental impact of a gas rich in carbon dioxide. The gas may be an exhaust product of a gas turbine engine 200, and thus the capture system 100 may reduce the environmentally harmful impact of the combustion of gas in a gas turbine engine 200.

Further, by using the exhaust products of gas turbine engine 200, e.g. the pressurised flue gas 101, to drive the liquid solvent 102 used for carbon capture through the two-phase atomising nozzle 103 in the capture system 100, the energy requirements of the capture system 100 may be reduced. Additionally or alternatively, the use of the pressurised flue gas 101 from the exhaust product of a gas turbine engine 200 may avoid the need for additional pumps and/or compressors to adequately pressurise the pressurised flue gas 101.

Further, by avoiding the need to use a conventional scrubber column, the overall weight and footprint of the capture system 100 may also be reduced.

The invention claimed is:

1. A carbon dioxide capture system, the system comprising:
   a pressurized gas source configured to provide a pressurized gas, wherein the pressurized gas is ambient air pressurized by a compressor, fan, blower or pump;
   a solvent source configured to provide a liquid solvent, wherein the liquid solvent is a substance comprising an amime group;
   a two-phase atomizing nozzle in fluid communication with the pressurized gas source and the solvent source;
   wherein the two-phase atomizing nozzle is configured for two-phase flow of a mixture of the pressurized gas and the liquid solvent in order to generate an atomized solvent spray of the liquid solvent;
   an inlet to the capture system, the inlet being upstream of the two-phase atomizing nozzle and in fluid communication with the pressurized gas source; and
   an outlet from the capture system, which is downstream of the two-phase atomizing nozzle, so that a part of the pressurized gas enters the inlet and flows past the two-phase atomizing nozzle, being exposed to the atomized solvent spray, before passing out the outlet;
   wherein the atomized solvent spray is configured to capture carbon dioxide present in the pressurized gas.

2. The capture system as claimed in claim 1, wherein the pressurized gas is configured to drive the solvent through the two-phase atomizing nozzle to generate the atomized solvent spray.

3. The capture system as claimed in claim 1, wherein the atomized solvent spray, upon generation, comprises solvent droplets having a droplet diameter of 150 μm or less.

4. The capture system as claimed in claim 1, further comprising a solvent regeneration unit, wherein the solvent regeneration unit is configured to separate solvent from any carbon dioxide present in the solvent.

5. The capture system as claimed in claim 4, wherein the solvent regeneration unit is the solvent source.

6. The capture system as claimed in claim 1, further comprising a direct contact cooler downstream of the atomized solvent spray, wherein the direct contact cooler is configured to condense the atomized solvent spray.

7. The capture system as claimed in claim 1, further comprising one or more demisters configured to condense the atomized solvent spray.

8. The capture system as claimed in claim 1, which is onshore.

9. A method for carbon dioxide capture, the method comprising:
   providing a pressurized gas;
   providing a first part of the pressurized gas to a two-phase atomizing nozzle;
   providing liquid solvent to the two-phase atomizing nozzle;
   generating an atomized solvent spray using the two-phase atomizing nozzle; and
   providing a second part of the pressurized gas to an inlet of a carbon dioxide capture system, the inlet being upstream of the two-phase atomizing nozzle so that said second part of the pressurized gas is exposed to said atomized solvent spray, before passing out an outlet of the capture system, which is downstream of the two-phase atomizing nozzle;
   wherein the liquid solvent is a substance comprising an amine group;
   wherein the pressurized gas is ambient air pressurized by a compressor, fan, blower or pump; and
   wherein the two-phase atomizing nozzle is configured for two-phase flow of a mixture of the pressurized gas and the liquid solvent in order to generate the atomized solvent spray of the liquid solvent.

10. The method as claimed in claim 9, comprising:
    providing the ambient air to the inlet of the carbon dioxide capture system.

11. The method as claimed in claim 9 further comprising: driving the liquid solvent through the two-phase atomizing nozzle using the pressurized gas.

12. The method as claimed in claim 9, comprising: separating solvent from any carbon dioxide present in the solvent using a solvent regeneration unit.

13. The method as claimed in claim 9, wherein the method is performed by the capture system of claim 1.

14. The method as claimed in claim 9 which is carried out onshore.

* * * * *